United States Patent [19]

Mori et al.

[11] Patent Number: 4,914,458

[45] Date of Patent: Apr. 3, 1990

[54] IMAGE FORMING APPARATUS

[75] Inventors: Hiroshi Mori; Yoichiro Sugino, both of Yokohama, Japan

[73] Assignee: Ricoh Company, Ltd., Tokyo, Japan

[21] Appl. No.: 247,257

[22] Filed: Sep. 21, 1988

[30] Foreign Application Priority Data

Oct. 6, 1987 [JP] Japan ................................ 62-252016

[51] Int. Cl.[4] ................................................ G01D 15/00

[52] U.S. Cl. .................................. 346/160; 346/160.1

[58] Field of Search .................... 346/160, 108, 107 R, 346/160.1; 355/5, 67, 71; 358/300, 302

[56] References Cited

U.S. PATENT DOCUMENTS 3,698,928 10/1972 Blome .................................. 117/45

4,046,474 9/1977 Lee ...................................... 346/160

4,761,660 8/1988 Lee ...................................... 346/160

4,816,845 3/1989 Soya et al. .......................... 346/160

FOREIGN PATENT DOCUMENTS 0236080 9/1987 European Pat. Off. ............ 346/160

38664 of 1987 Japan .................................. 346/160

*Primary Examiner*—Arthur G. Evans

*Attorney, Agent, or Firm*—Cooper & Dunham

[57] ABSTRACT

An image forming apparatus forms a recorded image of an original image on a recording sheet by an electrophotography method. An optical scanning unit emits a laser beam which scans a surface of a photosensitive drum. The image forming apparatus is provided with a light absorbing member for absorbing the laser beam which is reflected by the surface of the photosensitive drum so as to prevent a flare from being generated.

12 Claims, 3 Drawing Sheets

IMAGE FORMING APPARATUS

BACKGROUND OF THE INVENTION

The present invention generally relates to image forming apparatuses, and more particularly to an image forming apparatus which forms an image on a recording sheet such as a paper by an electrophotography method.

FIG. 1 shows an essential part of an example of a conventional image forming apparatus which forms an image on a paper by an electrophotography method. The image is written on a photosensitive drum by a laser beam which scans the photosensitive drum, and an electrostatic image is formed on the photosensitive drum by this scanning of the laser beam. The electrostatic image is developed into a visible image, and the visible image is transferred on the paper and fixed thereby completing an operation of forming the image on the paper.

In FIG. 1, a photosensitive drum 10 is provided rotatably in a direction of an arrow. A charger 12, a developing unit 16, a transfer/separation charger 18, a discharger 20, a cleaning unit 22 and a discharge lamp 24 are provided in a vicinity of the photosensitive drum 10 in this sequence along the rotating direction of the photosensitive drum 10.

An optical scanning unit 14 optically scans the photosensitive drum 10 by a laser beam L the light intensity of which has been modulated depending on an image signal describing an original image. The laser beam L scans the photosensitive drum 10 between the charger 12 and the developing unit 16 so as to write the image on the photosensitive drum 10.

The image forming apparatus is also provided with cassettes 36 and 38 which accommodate recording paper S, feeding units 26 and 28 for feeding the paper S from the respective cassettes 36 and 38, resist rollers 30, a fixing unit 32, and a tray 34 for receiving the paper S having the image formed thereon.

The image is formed on the paper S as follows. First, the photosensitive drum 10 starts to rotate clockwise, and a surface of the photosensitive drum 10 is discharged by the discharger 20. Then, the surface of the photosensitive drum 10 is uniformly charged by the charger 12. The image is written on the charged surface of the photosensitive drum 10 by the scanning of the laser beam L emitted from the optical scanning unit 14, and an electrostatic image is formed on the surface of the photosensitive drum 10. This electrostatic image corresponds to the image to be formed on the paper S. The electrostatic image is developed by the developing unit 16 and becomes a visible image (toner image).

On the other hand, during this time, the paper S accommodated within the cassette 36, for example, is fed by the feeding unit 26 and the paper S is set to a waiting position where a tip end of the paper S is pinched between the resist rollers 30. The resist rollers 30 supply the paper S in the waiting position to a transfer part of the image forming apparatus in synchronism with a movement of the visible image on the photosensitive drum 10.

In the transfer part, the visible image on the photosensitive drum 10 is transferred onto the paper S by the transfer/separation charger 18, and the paper S having the visible image thereon is separated from the photosensitive drum 10 and transported towards the fixing unit 32. The visible image on the paper S is fixed by the fixing unit 32, and the paper S having the fixed visible image thereon is ejected onto the tray 34.

After the visible image is transferred onto the paper S, the surface of the photosensitive drum 10 is cleaned by the cleaning unit 22 so as to remove residual toner on the photosensitive drum 10, and the surface of the photosensitive drum 10 is discharged by the discharge lamp 24.

The image is written on the photosensitive drum 10 by the laser beam L so that a portion of the surface of the photosensitive drum 10 corresponding to a white portion of the image is exposed and a portion of the surface of the photosensitive drum 10 corresponding to a black portion of the image is not exposed but visualized by the toner. When forming the image on a plurality of paper S, the supply of the paper S is successively carried out from a portion A shown in FIG. 1.

When the paper S having the image formed thereon by the conventional image forming apparatus is examined in detail, it is found that the density of some black portions of the recorded image is relatively lower than the density of other black portions of the recorded image, even though the black portions should originally have the same density. In other words, even when all of the black portions of the original image have the same density, some black portions of the recorded image on the paper S have a density relatively lower than that of other black portions of the recorded image. The generation of the black portions of the recorded image having the relatively low density is especially conspicuous at a boundary portion between a black portion and a white portion, and also when the original image consists of general characters or a pattern of fine lines. In addition, it is found that the density of the black portion of the recorded image becomes low especially in a vicinity of both end portions of each scan of the laser beam L along a main scanning direction.

Therefore, there is a problem in that the picture quality of the recorded image is unsatisfactory due to the inconsistent density of the black portions of the recorded image.

SUMMARY OF THE INVENTION

Accordingly, it is a general object of the present invention to provide a novel and useful image forming apparatus in which the problems described above are eliminated.

Another and more specific object of the present invention is to provide an image forming apparatus provided with a means for absorbing a scanning laser beam which is reflected by a surface portion of a photosensitive body. According to the image forming apparatus of the present invention, it is possible to prevent the generation of a flare which causes a secondary exposure on the surface of the photosensitive body. As a result, it is possible to greatly improve the picture quality of the recorded image.

Still another object of the present invention is to provide an image forming apparatus which forms a recorded image of an original image on a recording sheet by an electrophotography method comprising a photosensitive body, scanning means for scanning a surface of the photosensitive body by a laser beam depending on the original image so as to form an electrostatic image of the original image on the surface of the photosensitive body, transfer means for transferring and fixing the electrostatic image on the surface of the photosensitive body onto the recording sheet, and light absorbing means located at a position confronting the surface of the photosensitive body for substantially absorbing the laser beam which is reflected by the surface of the photosensitive body. According to the image forming apparatus of the present invention, the density of the recorded image is controlled to be uniform.

Other objects and further features of the present invention will be apparent from the following detailed description when read in conjunction with the accompanying drawings.

DETAILED DESCRIPTION

First, a description will be given on the reason why the density of black portions of a recorded image on a paper becomes non-uniform even when the density of corresponding black portions of an original image is uniform.

The present inventors have found that the non-uniform density of the black portions is caused by a flare generated when the laser beam scans the photosensitive drum.

Figure 1:
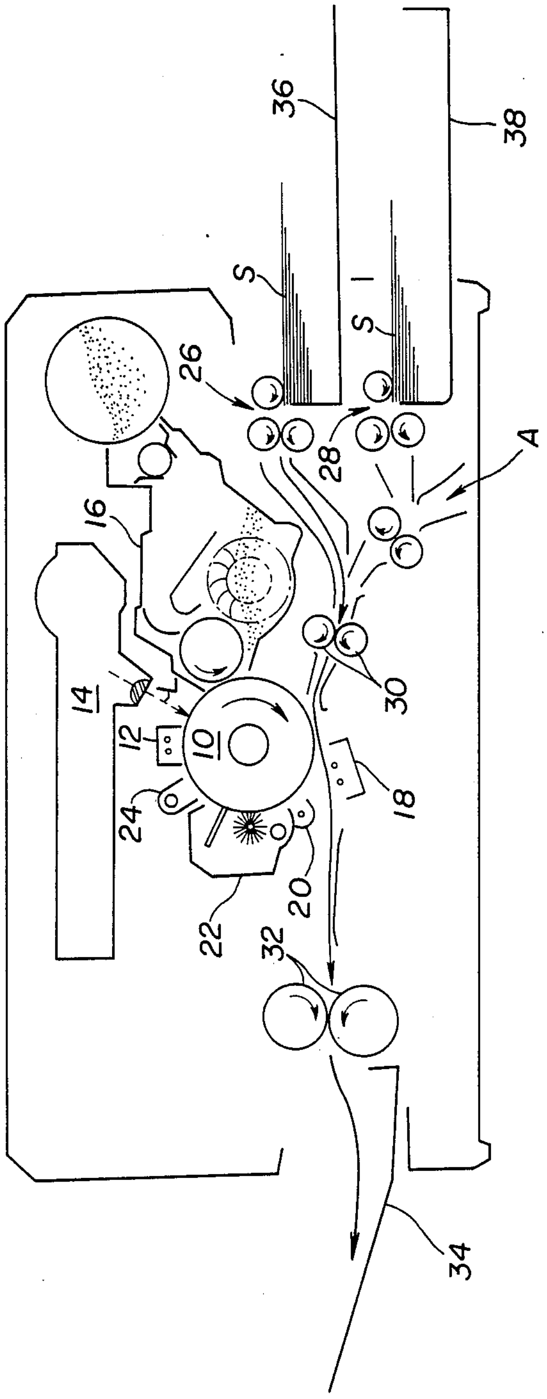
FIG. 1 (PRIOR ART)
FIG. 1 is a cross sectional view showing an essential part of an example of a conventional image forming apparatus.
Figure 2:
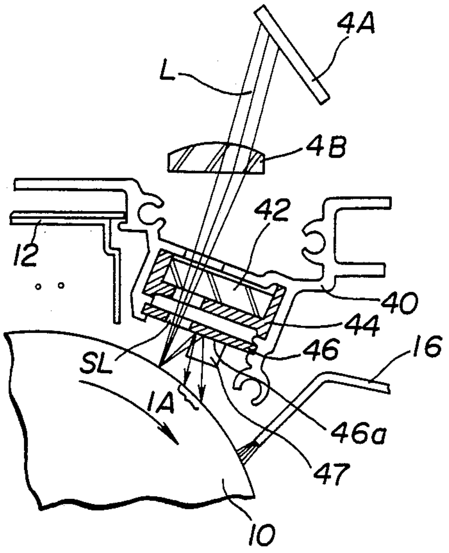
FIG. 2 is a cross sectional view showing an essential part of the conventional image forming apparatus for explaining the problems thereof.

FIG. 2 shows the optical scanning unit 14 of the conventional image forming apparatus together with a portion of the photosensitive drum 10. In FIG. 2, those parts which are the same as those corresponding parts in FIG. 1 are designated by the same reference numerals, and a description thereof will be omitted. In FIG. 2, the optical scanning unit 14 has a mirror 4A and a cylindrical lens 4B. The laser beam L the light intensity of which has been modulated depending on the image signal describing the original image is reflected by the mirror 4A and is ejected from the optical scanning unit 14 through the cylindrical lens 4B. The ejected laser beam L is converged in a form of a spot on the surface of the photosensitive drum 10. The spot of the laser beam L scans the surface of the photosensitive drum 10 in a main scanning direction which is perpendicular to the paper in FIG. 2, and the scanning progresses in a sub scanning direction as the photosensitive drum 10 rotates in the direction of the arrow. The main scanning direction extends in a longitudinal direction of the photosensitive drum 10.

A portion of the optical scanning unit 14 in a vicinity of the cylindrical lens 4B is shielded by a shield member 40 so as to protect the optical scanning unit 14 from the toner. A holder 44 which holds a shield glass 42 is mounted on a portion of the shield member 40. In addition, a printed circuit board (PCB) 46 which holds a thermistor 47 is mounted on the side of the shield member 40 confronting the photosensitive drum 10.

The laser beam L is transmitted through the shield glass 42 as it is converged, passed through a slit SL formed in the PCB 46 and converged on the surface of the photosensitive drum 10. The slit SL has an elongated shape extending along the main scanning direction.

Generally, the surface of the photosensitive drum 10 is smooth. For this reason, a considerable portion of the incident laser beam L is reflected by a photoconductive surface and a conductive substrate surface of the photosensitive drum 10. When the reflected laser beam portion returns in the same direction as the incident laser beam L, the reflected laser beam portion becomes a source of noise in the optical scanning unit 14. Hence, the laser beam L is made to hit the surface of the photosensitive drum 10 with a predetermined incident angle (for example, approximately 12 degrees) in order to prevent the reflected laser beam portion from returning in the same direction as the incident laser beam L.

Accordingly, when the laser beam L is reflected by the surface of the photosensitive drum 10, the reflected laser beam portion hits a surface 46*a* of the PCB 46 confronting the surface of the photosensitive drum 10. However, the surface 46*a* is white and is a light diffuse reflection surface. Consequently, the reflected laser beam portion is further reflected by the surface 46*a* as a flare which exposes the surface of the photosensitive drum 10 for the second time (hereinafter referred to as a secondary exposure). This secondary exposure is especially notable at a portion 1A of the surface of the photosensitive drum 10 in FIG. 2.

Figure 3:
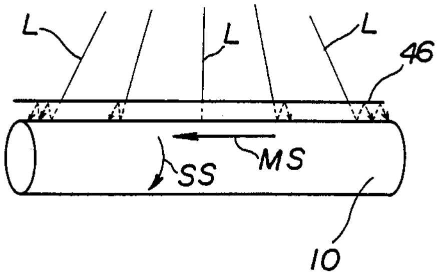
FIG. 3 shows a photosensitive drum for explaining the problems of the conventional image forming apparatus.

FIG. 3 shows the photosensitive drum 10 for explaining the incident angle of the laser beam L. In FIG. 3, MS denotes the main scanning direction and SS denotes the sub scanning direction. As shown, the incident angle of the laser beam L becomes large at both end portions of each scan in the main scanning direction MS. Hence, the reflected laser beam portion is repeatedly reflected at the surface of the photosensitive drum 10 and the surface 46*a* of the PCB 46 at the end portions of each scan, and the flare generated thereby causes the secondary exposure on the surface of the photosensitive drum 10. As a result, the undesirable effects of the flare are especially notable at the end portions of each scan in the main scanning direction MS.

Figure 4:
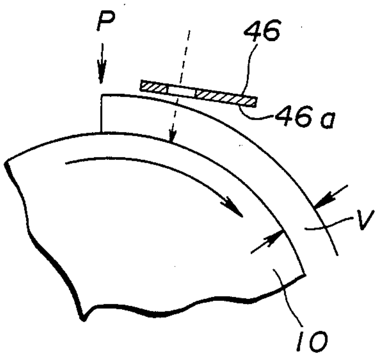
FIGS. 4 and 5 are cross sectional views respectively showing a portion of the photosensitive drum for explaining the problems of the conventional image forming apparatus.
Figure 5:
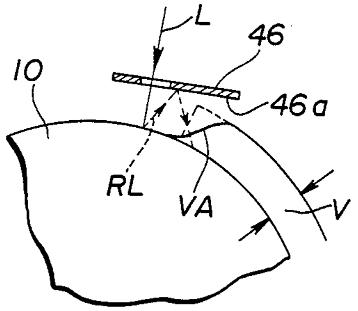

FIGS. 4 and 5 respectively show the PCB 46 together with a portion of the photosensitive drum 10. In FIGS. 4 and 5, those parts which are the same as those corresponding parts in FIG. 2 are designated by the same reference numerals, and a description thereof will be omitted. In FIG. 4, a point P indicates a charge position on the photosensitive drum 10. When a surface potential of the photosensitive drum 10 due to the charge is denoted by V, the surface potential V virtually does not change as shown in FIG. 4 when the write operation with respect to the black portion of the image continues, that is, when the surface of the photosensitive drum 10 is not exposed by the laser beam L. But when the write operation starts thereafter with respect to the white portion of the image, the surface of the photosensitive drum 10 starts to become exposed by the laser beam L and a reflected laser beam portion RL which generates the flare causes the secondary exposure on the surface of the photosensitive drum 10. Hence, a rear end part of the black portion along the sub scanning direction SS is affected by the secondary exposure, and an attenuation VA occurs in the surface potential at this rear end part of the black portion. As a result, a low density portion is generated at a boundary portion between the black portion and the white portion of the recorded image.

It may be readily understood that the undesirable effects of the flare are especially conspicuous when the original image consists of general characters or a pattern of fine lines. On the contrary, the undesirable effects of the flare are less conspicuous when the original image consists of a black portion having a large area such as graphics.

The present invention eliminates the undesirable effects of the flare by providing a light absorbing means on a surface which confronts the surface of the photosensitive drum and receives the reflected laser beam portion so as to prevent the secondary exposure on the surface of the photosensitive drum.

Figure 6:
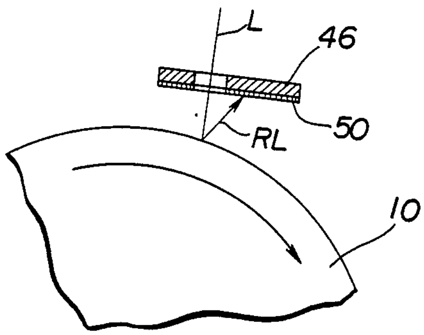
FIG. 6 is a cross sectional view showing an essential part of an embodiment of the image forming apparatus according to the present invention.

Next, a description will be given of an embodiment of the image forming apparatus according to the present invention. FIG. 6 shows an essential part of an embodiment of the image forming apparatus according to the present invention. The remaining parts of the image forming apparatus are the same as those of the conventional image forming apparatus shown in FIG. 1, and illustration and description thereof will be omitted. Further, in FIG. 6, those parts which are essentially the same as those corresponding parts in FIGS. 1 and 2 are designated by the same reference numerals.

The flare is generated by the reflected laser beam portion RL of the laser beam L which hits the surface of the photosensitive drum 10 when the reflected laser beam portion RL is further reflected by the surface of the PCB 46 confronting the surface of the photosensitive drum 10. Hence, in this embodiment, a light absorbing member 50 is provided on the surface of the PCB 46 confronting the surface of the photosensitive drum 10. The light absorbing member 50 absorbs the reflected laser beam portion RL and reduces or eliminates the further reflection of the reflected laser beam portion RL. As a result, the generation of the flare is suppressed or eliminated, thereby considerably reducing or completely eliminating the secondary exposure on the surface of the photosensitive drum 10.

In this embodiment, the light absorbing member 50 is coated with a black paint having no gloss. However, it is possible to adhere on the surface of the PCB 46 confronting the surface of the photosensitive drum 10 a member which effectively prevents the reflection of the reflected laser beam portion RL. The member may have the form of a black paper, black tape or sheet. In addition, because the laser beam L is monochromatic, it is possible to use materials which are not black but absorb the laser beam L with a high absorbance.

Figure 7:
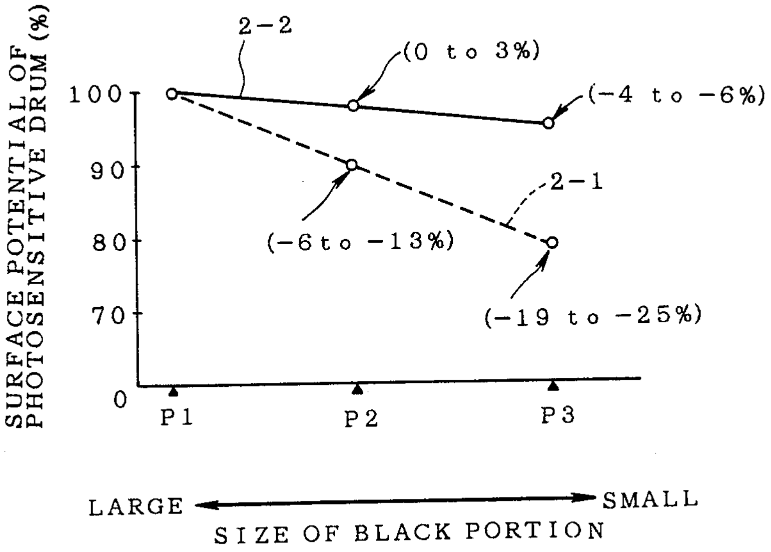
FIG. 7 shows a surface potential of a photosensitive drum versus size of black portion of image characteristic obtainable in the embodiment in comparison with the characteristic obtainable in the conventional image forming apparatus.

FIG. 7 shows a surface potential of the photosensitive drum 10 versus size of black portion of image characteristic obtainable in the embodiment in comparison with the characteristic obtainable in the conventional image forming apparatus. In FIG. 7, the ordinate indicates the surface potential of the photosensitive drum 10 at the time of the developing with the surface potential at the time of the charge set to 100%. In addition, the abscissa indicates the size of the black portion of the recorded image and the size of the black portion decreases towards the right-hand side in FIG. 7.

In FIG. 7, a pattern P1 corresponds to a relatively large black portion such as graphics, a pattern P2 corresponds to a black portion such as bold-faced characters and lines, and a pattern P3 corresponds to a relatively small black portion such as the general characters and a pattern of fine lines. A characteristic 2-1 indicated by a phantom line is obtained in the conventional image forming apparatus, while a characteristic 2-2 indicated by a solid line is obtained in the embodiment of the image forming apparatus according to the present invention. In the case of the pattern P3, the surface potential of the photosensitive drum 10 at the black portion is too small for a measuring apparatus to follow and for this reason the values are approximative for the characteristics 2-1 and 2-2. Further, the percentages in brackets such as (−4 to −6%) indicates that the surface potential (%) is less than 100% by the amount in the brackets, that is −4 to −6% less than 100% in this case.

It may be readily understood by comparing the characteristics 2-1 and 2-2 that the deterioration in the density of the black portion of the recorded image is considerably suppressed with respect to the pattern P3 which corresponds to the relatively small black portion such as the general characters and the pattern of fine lines usually contained in a document which is copied. As a result, the picture quality of the recorded image is extremely satisfactory in the embodiment.

In the description given heretofore, the recorded image is described in terms of the black portions and the white portions. However, the color of the recorded image which is actually made depends on the color of the toner used. Hence, it should be noted that the "black portion" of the recorded image does not necessarily indicate the actual color of the corresponding portion of the original image but actually corresponds to the portion which is not exposed when the optical scanning takes place.

Further, the present invention is not limited to these embodiments, but various variations and modifications may be made without departing from the scope of the present invention.

What is claimed is:

1. An image forming apparatus which forms a recorded image of an original image on a recording sheet by an electrophotography method, said image forming apparatus comprising:

a photosensitive body;

scanning means for scanning a surface of said photosensitive body by a laser beam modulated depending on the original image so as to form an electrostatic image of the original image on the surface of said photosensitive body;

transfer means for transferring and fixing the electrostatic image on the surface of said photosensitive body onto the recording sheet; and light absorbing means located at a position confronting the surface of said photosensitive body for substantially absorbing the laser beam which is reflected by the surface of said photosensitive body to keep the laser beam reflected by the surface of said photosensitive body from causing a secondary exposure on the surface of said photosensitive body.

2. An image forming apparatus as claimed in claim 1, in which said photosensitive body comprises a rotatable photosensitive drum, and said optical scanning means scans a surface of said photosensitive drum in a main scanning direction along a longitudinal direction of said photosensitive drum and in a sub scanning direction as said photosensitive drum rotates, said optical scanning means emitting the laser beam with a predetermined incident angle with respect to the surface of said photosensitive drum so that the laser beam reflected by the surface of said photosensitive drum travels in a direction different from that of the incident laser beam from said optical scanning means.

3. An image forming apparatus as claimed in claim 1, in which said light absorbing means is provided on a surface of said optical scanning means confronting the surface of said photosensitive body.

4. An image forming apparatus as claimed in claim 3, in which said light absorbing means comprises a coating on the surface of said optical scanning means, said coating having a high absorbance for substantially absorbing the laser beam reflected by the surface of the photosensitive body.

5. An image forming apparatus as claimed in claim 3, in which said light absorbing means comprises a member adhered on the surface of said optical scanning means, said member having a high absorbance for substantially absorbing the laser beam reflected by the surface of the photosensitive body.

6. An image forming apparatus as claimed in claim 5, in which said member comprises a tape.

7. An image forming apparatus as claimed in claim 3, in which said means comprises a no-gloss black coating for substantially absorbing the laser beam reflected by the surface of said photosensitive body.

8. An image forming apparatus as claimed in claim 1, in which said light absorbing means comprises a member with a high absorbance for substantially absorbing the laser beam reflected by the surface of said photosensitive body.

9. An image forming apparatus as claimed in claim 1, in which said light absorbing means comprises a no-gloss black surface for substantially absorbing the laser beam reflected by the surface of said photosensitive body.

10. An image forming apparatus as claimed in claim 1, which further comprises a charger for uniformly charging the surface of said photosensitive body before scanning by the laser beam, said transfer means having a developing unit for developing the electrostatic image on the surface of said photosensitive body into a visible image, said light absorbing means being provided between said charger and said developing unit.

11. An image forming apparatus as claimed in claim 10, in which said photosensitive body comprises a rotatable photosensitive drum, said light absorbing means being provided between said charger and said developing unit along a rotating direction of said photosensitive drum.

12. An image forming apparatus which forms a recorded image of an original image on a recording sheet by an electrophotography method, said image forming apparatus comprising:

a photosensitive body;

scanning means for scanning a surface of said photosensitive body by a laser beam modulated depending on the original image so as to form an electrostatic image of the original image on the surface of said photosensitive body;

transfer means for transferring and fixing the electrostatic image on the surface of said photosensitive body onto the recording sheet; and light absorbing means located at a position confronting the surface of said photosensitive body for substantially absorbing the laser beam which is reflected by a surface portion of said photosensitive body to keep the laser beam reflected by the surface of said photosensitive body from causing a secondary exposure on the surface of said photosensitive body;

said surface portion including a photoconductive surface and a conductive substrate surface of said photosensitive body.

* * * * *